United States Patent [19]

Williams et al.

[11] Patent Number: 5,087,996
[45] Date of Patent: Feb. 11, 1992

[54] DISK DRIVE METHOD AND APPARATUS

[75] Inventors: Roger O. Williams, Fremont; Titus E. Davis, Sunnyvale, both of Calif.

[73] Assignee: Tronix Peripherals, Inc., Santa Clara, Calif.

[21] Appl. No.: 455,078

[22] Filed: Dec. 22, 1989

[51] Int. Cl.⁵ .................... G11B 5/55; G11B 5/596
[52] U.S. Cl. ....................... 360/78.01; 360/78.04
[58] Field of Search ......................... 360/78.01, 78.04

[56] References Cited

U.S. PATENT DOCUMENTS 4,633,343  12/1986  Maury .......................... 360/78.12

Primary Examiner—A. J. Heinz
Attorney, Agent, or Firm—Thomas E. Schatzel

[57] ABSTRACT

A disk drive has a side-zero and a side-one analog and digital circuits. The disk drive may write both sides of the disk at the same time and then verify both sides at the same time. A microcontroller is connected to the side-zero and side-one digital circuits. The microcontroller receives the sensor index pulse from the index sensor and then sends a microcontroller index pulse to the side-zero and side-one digital circuits a predetermined period of time after receiving the sensor index pulse. The predetermined period of time is such that after the head is stepped to the next track and achieves a stable position, writing will begin.

17 Claims, 6 Drawing Sheets

Microfiche Appendix Included
(12 Microfiche, 1 Pages)

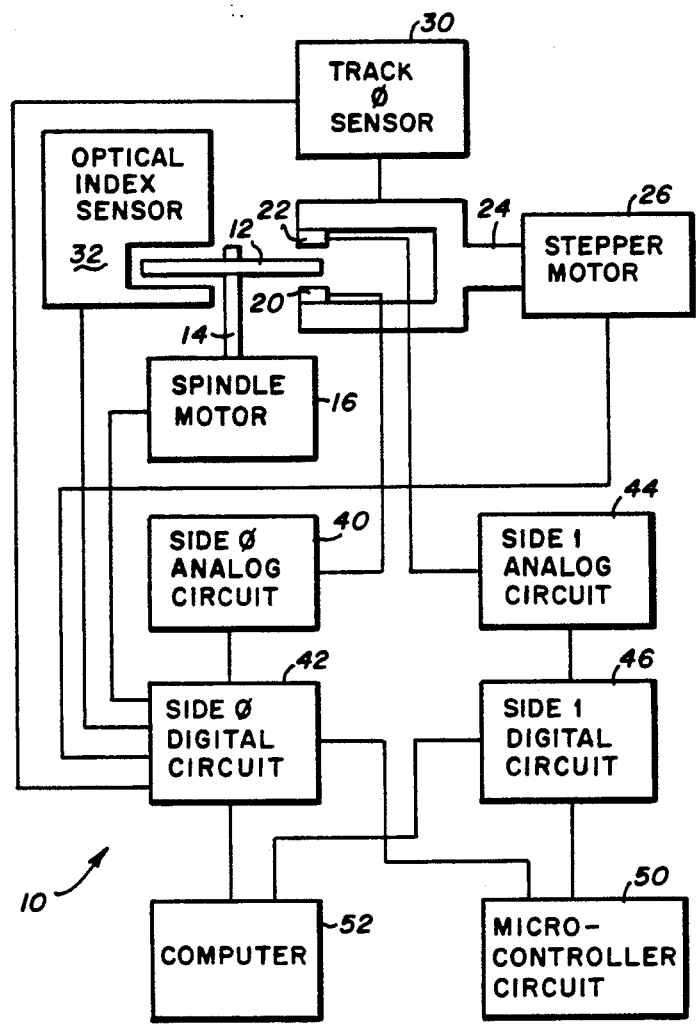
Fig_1
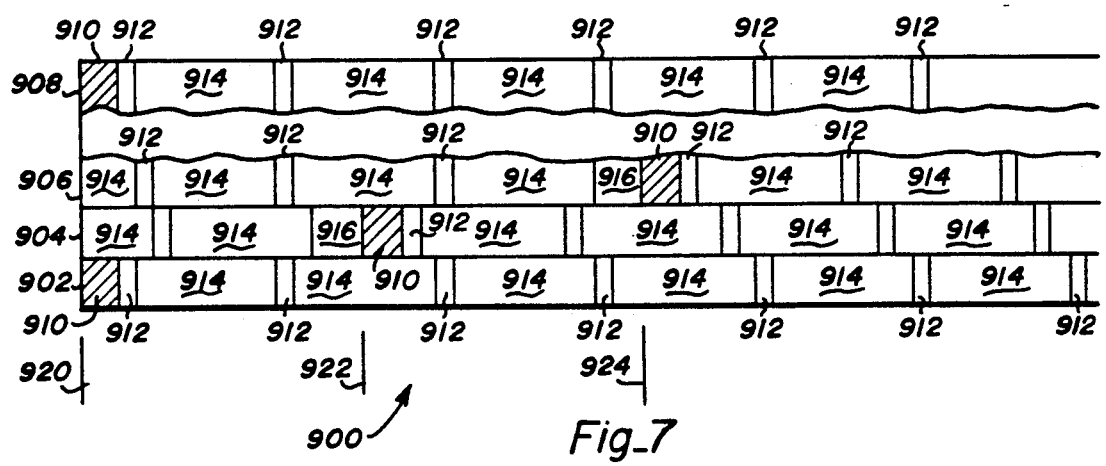
Fig_7

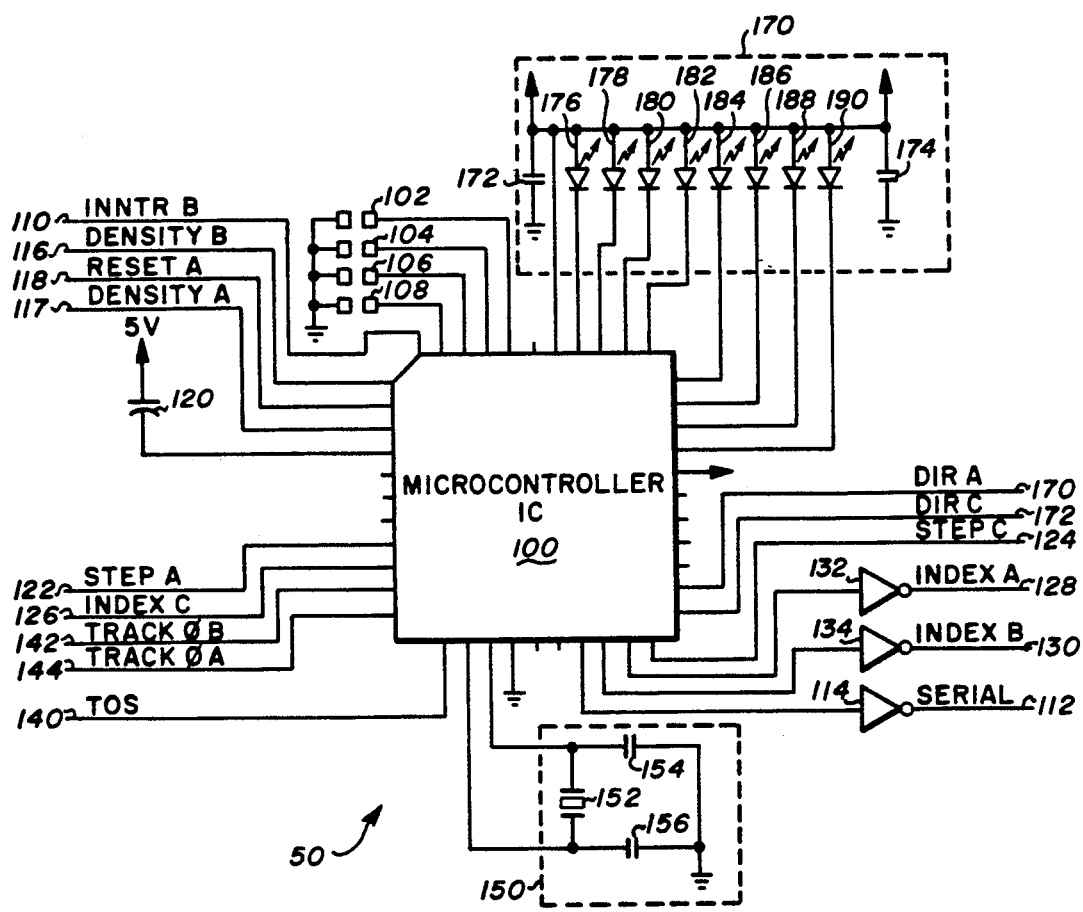
Fig_2

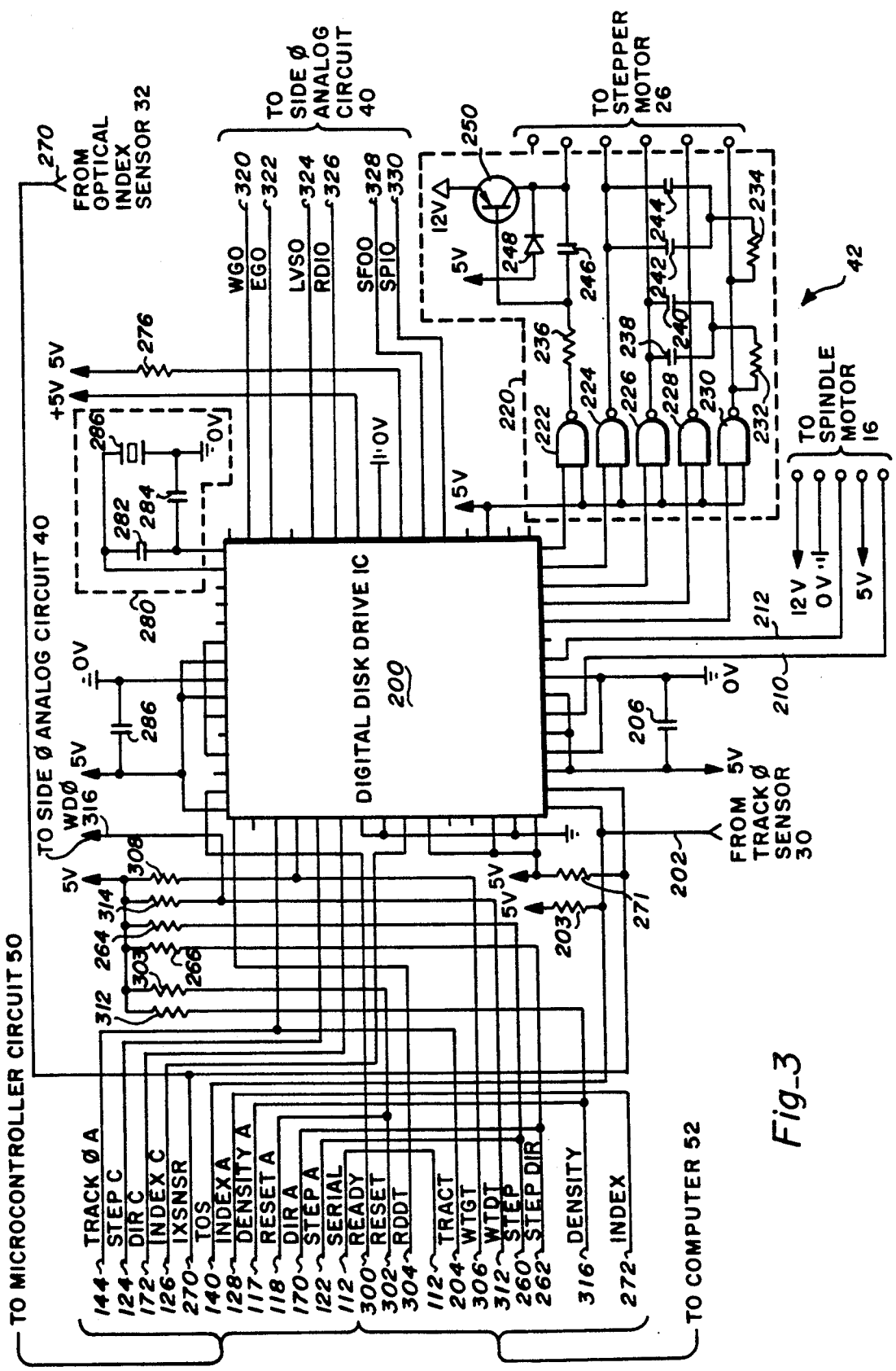

Fig_5

DISK DRIVE METHOD AND APPARATUS

A microfiche appendix comprising 12 frames contained on 1 microfiche is part of this application and is on file in the Patent and Trademark Office.

BACKGROUND OF THE INVENTION

1. Field of the Invention

This invention relates generally to disk drive systems and more specifically to a disk drive system having skewed data tracks.

2. Description of the Prior Art

Floppy disks are flexible magnetic media on which data may be recorded as magnetic pulses. The disks are inserted in disk drives for reading and writing in connection with computer systems.

Software manufacturers and producers duplicate a single software program onto disks for mass distribution. In the duplication production process, disk drives are connected to an industrial floppy disk copier which can write the same program onto several different disks in several different disk drives at the same time.

A problem with disk drives in computers as well as industrial disk copiers is that a relatively long time is required to write an entire disk. For example, in a standard double-sided floppy disk drive (48 TPI) the time required to duplicate a disk is approximately forty seconds. On the first revolution of the disk, the drive writes side zero of a first track. A typical revolution takes two hundred milliseconds. The disks rotate at three hundred revolutions per minute. On the second revolution, the drive verifies the data just written on side zero of that track. On the third revolution, the drive writes side one of the first track. On the fourth revolution, the drive verifies the data just written on side one on the first track. After the fourth revolution, the drive immediately steps the transducer head to the next track. However, a time period must pass before writing can begin to allow the head to settle into a stable position after the movement. At this point, the head has already passed the index position (i.e., the physical reference position which is used to locate the beginning of the track writing operation) and the head must complete a fifth revolution before writing can begin on the next index position. Each disk has an index hole for detection by an index sensor which in turn can generate an index pulse. This index pulse is then used by the disk drive as a signal that the disk is in position for commencing the write operation.

Thus, five complete revolutions of the disk are needed to write a single track on each side of a double-sided disk. Although the time delays for each of these revolutions are small, the total delay for writing the entire disk is substantial. Accordingly, a need exists to improve the speed of the disk writing operation.

SUMMARY OF THE INVENTION

It is an object of the present invention to provide a disk drive system which can write disks in less time than heretofore generally available.

Briefly, in a preferred embodiment, the present invention comprises a disk drive having separate side zero and side one analog and digital circuits. This allows the disk drive to write both sides of the disk at the same time and then verify both sides at the same time. A microcontroller is connected to the side zero and side one digital circuits. The microcontroller receives the physical index pulse from the index sensor and then sends a microcontroller index pulse to the side zero and side one digital circuits a predetermined period of time after receiving the physical index pulse. The predetermined period of time is such that after the head is stepped to the next track and achieves a stable position, writing will begin immediately.

It is an advantage of the present invention in that it provides a disk drive system which can write disks in less time than heretofore generally available.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a block diagram of the disk drive system of the present invention;

FIG. 2 is a circuit diagram of the microcontroller circuit of FIG. 1;

FIG. 3 is a circuit diagram of the side zero digital circuit of FIG. 1;

FIG. 7 is a schematic of the track pattern of a disk of the present invention.

DETAILED DESCRIPTION OF THE PREFERRED EMBODIMENT

Figure 4:
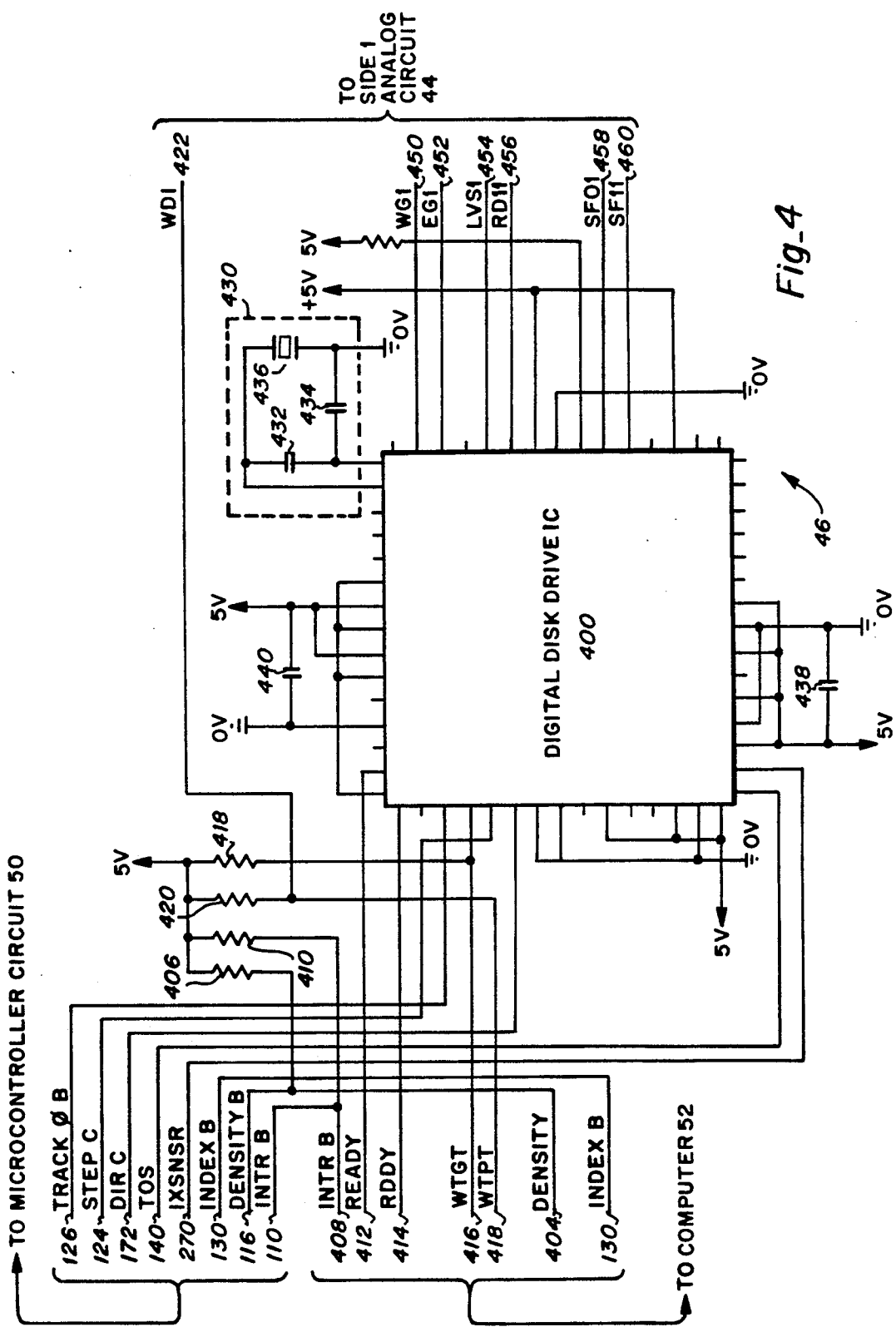
FIG. 4 is a circuit diagram of the side one digital circuit of FIG. 1.

FIG. 1 is a block diagram of a disk drive system of the present invention and is designated by the general reference numeral 10. A magnetic media disk 12 is mounted to a spindle 14 of a spindle motor 16. Spindle motor 16 is operated at a speed of six hundred revolutions per minute. A side-zero transducer head 20 and a side-one transducer head 22 are attached to a carriage arm 24 and are positioned on opposite sides of disk 12. Carriage arm 24 is attached to a stepper motor 26 which operates to move carriage arm 24 in a radial direction relative to disk 12.

A track zero sensor 30 is attached to carriage arm 24 and transmits a track zero pulse when the heads 20 and 22 are positioned over track zero. An optical index sensor 32 is positioned proximate disk 12. Sensor 32 detects the index hole in disk 12 as disk 12 revolves and the sensor 32 emits a sensor index signal responsive thereto.

A side-zero analog circuit 40 is connected to head 20. A side-zero digital circuit 42 is connected to analog circuit 40, spindle motor 16, stepper motor 26, track zero sensor 30 and optical sensor 32. A side-one analog circuit 44 is connected to head 22. A side-one digital circuit 46 is connected to analog circuit 44.

A microcontroller 50 is connected to digital circuits 42 and 46. A computer 52 is connected to digital circuits 42 and 46. Computer 52 may be a PC type of computer or an industrial disk duplicator.

FIG. 2 is a circuit diagram of the microcontroller circuit 50. Circuit 50 comprises a microcontroller integrated circuit (IC) 100. IC 100 may be an Intel 87C51 IC. IC 50 is programmed with firmware, a listing of which is enclosed as microfiche. A plurality of traces 102, 104, 106 and 108 are connected between IC 100 and ground. The firmware in IC 100 may work with a number of different disk types. In the preferred embodiment, the present invention may be used with 5¼ inch high density disks (1.2 M bytes of capacity and 600 Oersted), 5¼ inch low density disks (360 K bytes of capacity and 300 Oersted), 3½ inch high density disks (1.44 M bytes of capacity and 720 Oersted), 3½ inch low density disks (720 K bytes of capacity and 600 Oersted) and Macintosh disks (800 K bytes capacity and 600 Oersted). However, other format types may be used. IC 100 detects which combination of traces 102–108 are connected and that indicates which type of disk is to be used. For purposes of this disclosure, trace 102 is connected and this corresponds to the 5¼ inch low density disk type such as an IBM 360–720K disk.

An interrogation B line (INTR B) 110 is connected to IC 100 from computer 52 via digital circuit 46. Line 110 is for transmission of an interrogation signal. In response to the interrogation signal on line 110, IC 100 sends a serial number signal on a serial line 112. Line 112 returns to computer 52 via an inverter 114 and circuit 46. The serial number identifies the disk drive as being distinguishable from a standard disk drive. The difference between the present invention drive and the standard drive will be explained in more detail below.

A line 116 is the density B line. Line 116 comes from computer 52 via circuit 46. Line 116 is used to set the density of the data recorded on the disk 12. A line 117 is the density A line which comes from computer 52 via circuit 42 and is also used to set the density. A line 118 is tee reset A line from computer 52 via circuit 42. A reset signal on line 118 will reset the skew of the disk pattern back to the original position on the sensor index. This will be explained in greater detail below.

A capacitor 120 is connected between IC 100 and a voltage source. A line 122 is a Step A line which comes from computer 52 via circuit 42. Line 122 is used to transmit the step pulse signals which are output on a step C line 124. A line 126 is an index C line. IC 100 receives the Index C line 126 from circuit 42. IC 100 outputs an index A and index B signal on an index A line 128 and an index B line 130, respectively. An inverter 132 and an inverter 134 are connected along lines 128 and 130, respectively.

A line 140 is a track zero sensor (TOS) line which receives a track zero signal from circuit 42. IC 100 uses the signal from line 140 to let it know when heads 20 and 22 are on track zero. The track zero signal is then output simultaneously along lines 142 (track zero B) and 144 (track zero A) to circuits 42 and 46, respectively.

A timing circuit 150 is connected to and provides timing signals to IC 100. Circuit 150 comprises a crystal unit 152, a capacitor 154 and a capacitor 156. A direction A (DIRA) line 170 receives a direction A signal from computer 52 via circuit 42. This signal is buffered and output on a direction C (DIRC) line 172 as a direction C signal.

FIG. 3 shows a circuit diagram of the side-zero digital circuit 42. Circuit 42 comprises a digital disk drive integrated circuit 200. IC 200 may be a TEAC 1R4N09A IC.

The IC 200 is connected to the track zero sensor on a line 202. Line 202 is also connected to the TOS line 140. A pull-up resistor 203 is connected to TOS line 140. TOS line 140 goes to circuit 50 where the signal is modified and output on the track zero A line 144. Line 144 goes to the IC 200 and a track zero line 204 which goes to computer 52.

A capacitor 206 is connected to IC 200. IC 200 is connected to spindle motor 16 via control lines 210 and 212.

A stepper motor driver circuit 220 is connected to IC 200. Driver circuit 220 comprises a plurality of NAND gates 222–230, a plurality of resistors 232–236, a plurality of capacitors 238–246, a diode 248 and a transistor 250. The output of circuit 220 is connected to stepper motor 26. When computer 52 wants to change the track, it sends a step signal along a step line 260 and a direction signal along a step direction line (STEP DIR) 262. Lines 260 and 262 are connected to a couple of pull-up resistors 264 and 266, respectively. Lines 260 and 262 are connected to the step A line 122 and the direction A line 170, respectively. These lines go to circuit 50. The IC 200 uses the signals on the Step C line 12 and the DIR C line 172 to control stepper motor 26 via driver circuit 220.

The IC 200 and circuit 40 are connected to the optical sensor 32 via an index sensor line (IXSNSR) 270. A resistor 271 is connected to line 270. The IC 200 modifies the physical index signal or sensor index signal from line 270 and outputs it on the index C line 126 to circuit 50. Circuit 50 waits a predetermined period of time after receiving a signal on the index C line 126 and then outputs an index signal on the index A line 128 which goes to computer 52 via index line 272.

A pull-up resistor 276 is connected to IC 200. A timing circuit 280 is connected to IC 200. Circuit 280 comprises a capacitor 282, a capacitor 284 and a crystal unit 286. A capacitor 286 is connected to IC 200.

A ready line 300 is connected to IC 200 from computer 52. Line 300 carries the ready signal. A reset line 302 from computer 52 is connected to reset A line 118 and a pull-up resistor 303. A read data line (RDDT) 304 is connected to IC 200 and transmits the data to be read from the disk. A write gate line (WTGT) 306 is connected to IC 200 from computer 52 and carries the write gate signal which allows writing on the disk to take place. Line 306 is also connected to a pull-up resistor 308. A density line 310 from computer 52 is connected to density A line 117 and a pull-up resistor 312. A write data (WTDT) line 312 is connected to computer 52 and is connected to a write data line (WDO) 316 and pull-up resistor 314.

A write gate line (WGO) 320 is connected between analog circuit 40 and IC 200. Line 320 transmits the write gate signal which prepares circuit 40 for a write operation. An erase gate line (EGO) 322 is connected between circuit 40 and IC 200. Line 322 transmits an erase gate signal which prepares circuit 40 for an erase operation. A low voltage line (LVSO) 324 is connected between circuit 40 and IC 200. Line 324 transmits a low voltage signal when the voltage is below a certain point which shuts down circuit 40. A read data line (RD10) 326 is connected between IC 200 and circuit 40. Line 326 transmits the data to be read. A couple of switch filter lines (SF00) 328 and (SF10) 330 are connected between IC 200 and circuit 40. A switch filter signal is transmitted along both lines 328 and 330 when the heads 20 and 22 are moved passed a certain track.

FIG. 4 shows a circuit diagram of a side-one digital circuit 46. Circuit 46 comprises a digital disk drive integrated circuit 400. IC 400 may be a TEAC 1R4N09A IC. IC 400 is connected to the track zero B line 126, step C line 124, DIRC line 112, TOS line 140 and IXSNSR line 270. A density line 404 is connected between density A line 116 and computer 52. Density line 404 is also connected to a pull-up resistor 406. An interrogation line (INTR) 408 is connected between INTR B line 110 and computer 52. INTR line 408 is also connected to a pull-up resistor 410.

A ready line 412 is connected between computer 52 and IC 400 and transmits a ready signal to IC 400. A read data line (RDDT) 414 is connected between IC 400 and computer 52 and transmits data read from the disk. A write gate line (WTGT) 416 is connected between computer 52 and IC 400 for transmitting a write gate signal to IC 400 to allow the writing operation to occur. Line 416 is also connected to a pull-up resistor 418. A write data line (WTDT) 418 is connected between computer 52 and IC 400 for transmitting the data to be written on the disk. Line 418 is connected to a pull-up resistor 420 and a write data line (WDI) 422.

A timing circuit 430 is connected to IC 400. Circuit 30 comprises a capacitor 432, a capacitor 434 and a crystal unit 436. A capacitor 438 and a capacitor 440 are connected to IC 400.

A write gate line (WG1) 450 is connected between analog circuit 44 and IC 400. Line 450 transmits the write gate signal which prepares circuit 44 for a write operation. An erase gate line (EG1) 452 is connected between circuit 44 and IC 400. Line 452 transmits an erase gate signal which prepares circuit 44 for an erase operation. A low voltage line (LVS1) 454 is connected between circuit 44 and IC 400. Line 454 transmits a low voltage signal when the voltage is below a certain point which shuts down circuit 44. A read data line (RD11) 456 is connected between IC 400 and circuit 44. Line 456 transmits the data to be read. A couple of switch filter lines (SF01) 458 and (SF11) 460 are connected between IC 400 and circuit 44. A switch filter signal is transmitted along both lines 458 and 460 when the heads are moved passed a certain track.

Figure 5:
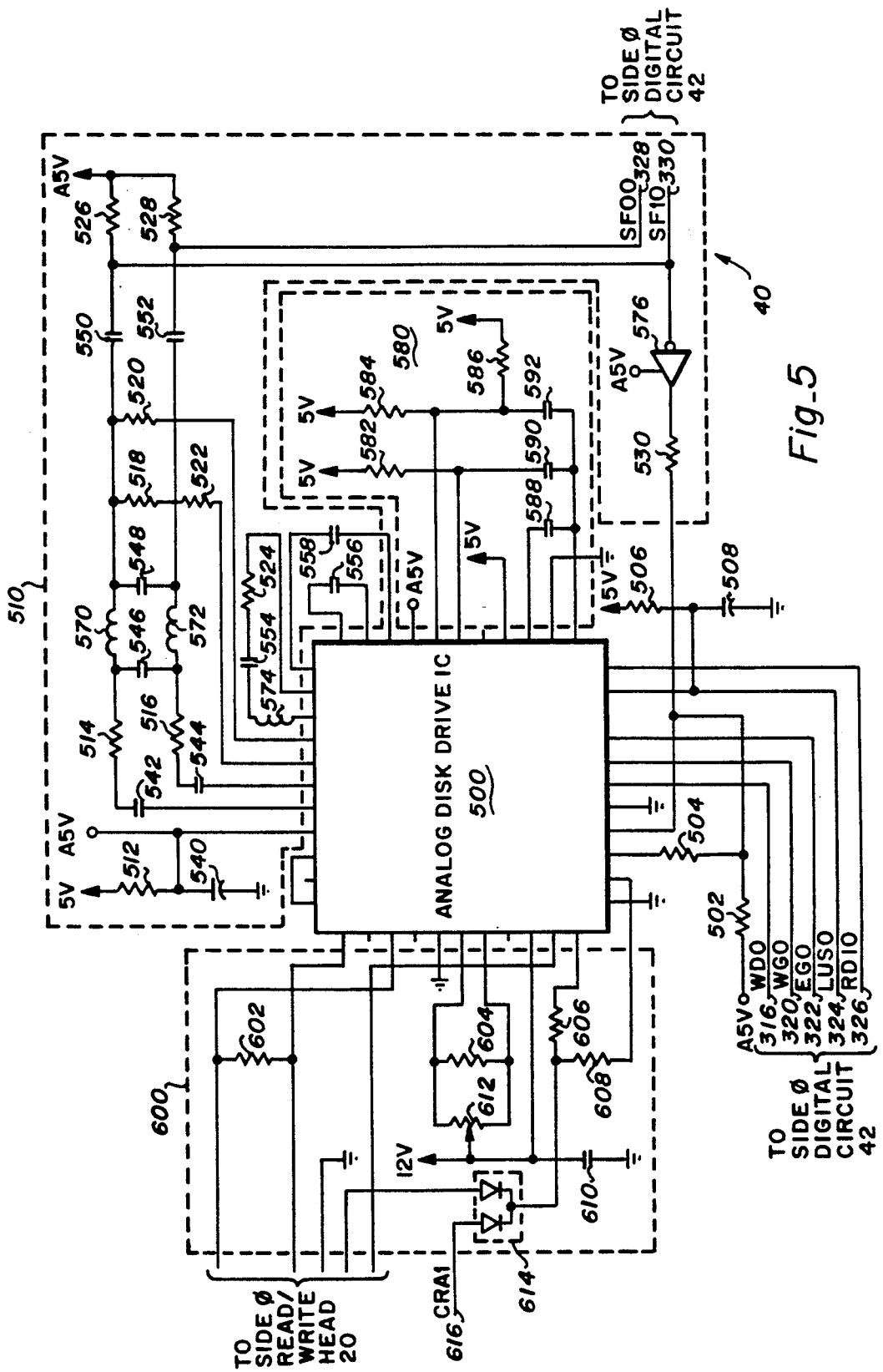
FIG. 5 is a circuit diagram of the side zero analog circuit of FIG. 1.

FIG. 5 shows a circuit diagram of the side-zero analog circuit 40. Circuit 40 comprises an analog disk drive integrated circuit 500. IC 500 may be a TEAC BA6581CK IC. IC 500 is connected to the WD0 line 316, the WG0 line 320, the EG0 line 322, the LVS0 line 324 and the RD10 line 326. A resistor 502, a resistor 504, a resistor 506 and a capacitor 508 are connected to IC 500.

A differential filter set circuit 510 is connected to IC 500. Circuit 510 comprises a plurality of resistors 512-530, a plurality of capacitors 540-558, a plurality of inductors 570-574 and an operational amplifier 576. Circuit 510 filters the waveform of the data signal which is to be read from the disk. This allows the drive 10 to be able to write on both sides of the disk at the same time. When the heads reach a certain track (track 22 in 5¼ inch low density disks, track 44 in 5¼ inch high density disks and track 44 in both low and high density 3½ inch disks), signals on lines 328 and 330 adjust the circuit 510 to allow for the variations due to head location.

A digital time domain circuit 580 comprises a plurality of resistor 582-586 and a plurality of capacitors 588-592. Circuit 580 determines the digital output pulse from analog data.

A read/write head interface circuit 600 is connected to IC 500. Circuit 600 comprises a plurality of resistors 602-608, a capacitor 610, a variable resistor 612 and a dual diode 614. Line 614 comes from the read/write head 20 and is used to prevent a current spike from returning to IC 500. Circuit 600 is connected to the side-zero read/write head 20.

Figure 6:
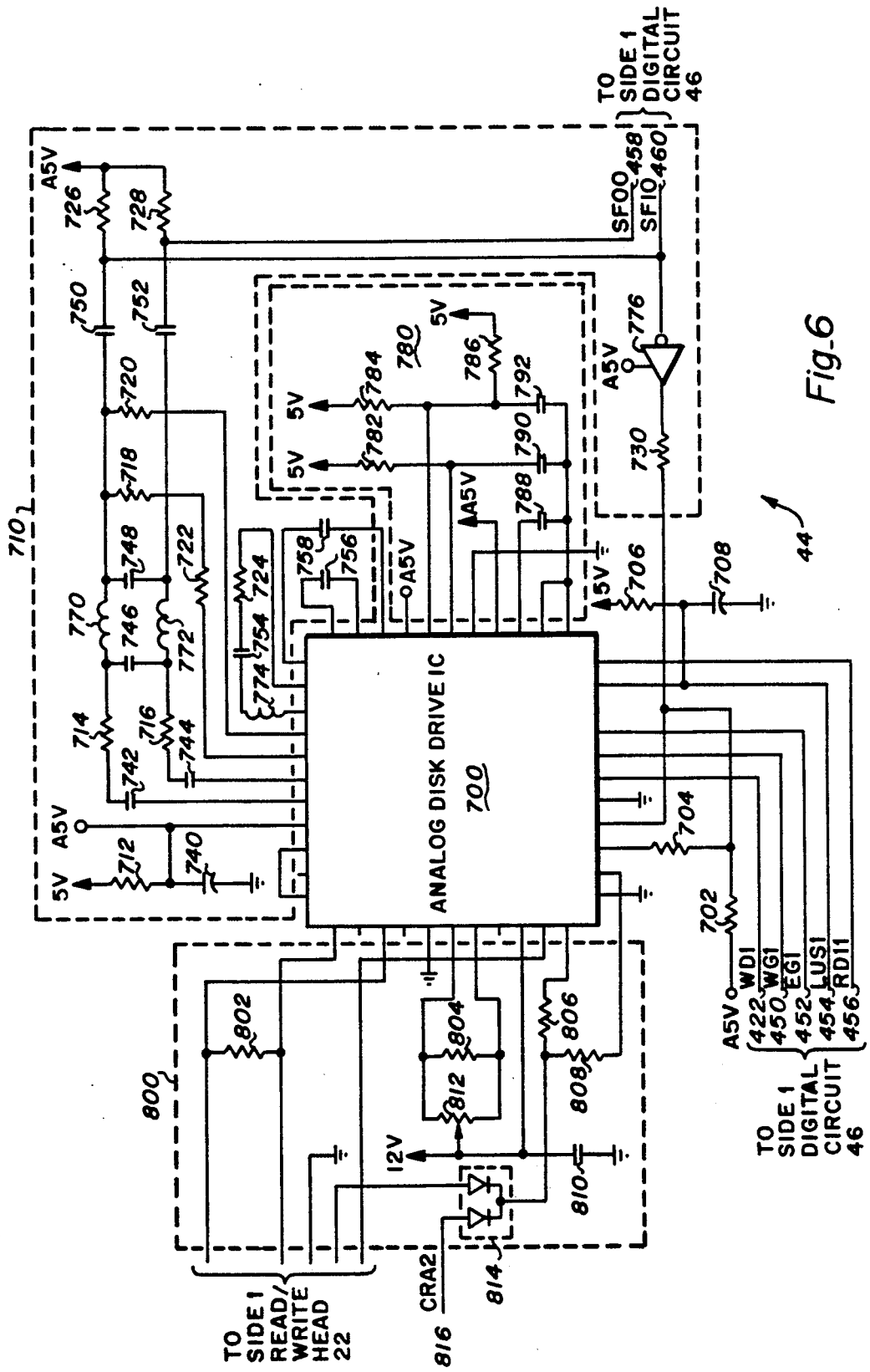
FIG. 6 is a circuit diagram of the side one analog circuit of FIG. 1.

FIG. 6 shows a circuit diagram of the side-one analog circuit 44. Circuit 44 comprises an analog disk drive integrated circuit 700. IC 700 may be a TEAC BA6581CK IC. IC 700 is connected to the WD1 line 422, the WG1 line 450, the EG1 line 452, the LVS1 line 454, and the RD11 line 456. A resistor 702, a resistor 704, a resistor 706 and a capacitor 708 are connected to IC 700.

A differential filter set circuit 710 is connected to IC 700. Circuit 710 comprises a plurality of resistors 712-730, a plurality of capacitors 740-758, a plurality of inductors 770-774 and an operational amplifier 776. Circuit 710 is similar to circuit 510 of FIG. 5. It filters the waveform of the signal which is read from the disk. Signals on lines 458 and 460 adjust the circuit 710 to allow for the variations due to head location.

A digital time domain circuit 780 comprises a plurality of resistors 782-786 and a plurality of capacitors 788-792. Circuit 780 determines the digital output pulse from analog data.

A read/write head interface circuit 800 is connected to IC 700. Circuit 800 comprises a plurality of resistors 802-808, a capacitor 810, a variable resistor 812 and a dual diode 814. Line 814 comes from the read/write head 22 and is used to prevent a current spike from returning to IC 700. Circuit 800 is connected to the side-one read/write head 22.

The operation of system 10 is believed to be as follows. During a write operation, system 10 will write a first track on both side-zero and side-one simultaneously on a first revolution of disk 12. This is possible because system 10 has separate digital and analog circuits for each head and also because of the differential filter circuits 510 and 710 which adjust the signal to prevent interference between the heads. The disk speed is six hundred revolutions per minute during these operations.

On the second revolution of disk 12, system 10 verifies the first track which was just written on both side-zero and side-one simultaneously. It should be noted that prior art systems could only write or verify one side at a time.

After completing the second revolution, system 10 steps heads 20 and 22 to the next track. However, instead of waiting one entire revolution before beginning writing on the next sensor index pulse from the index sensor, system 10 will begin to write the second track immediately after the heads 20 and 22 have stabilized themselves on this new track. Microcontroller circuit 50 of system 10 does this by monitoring the sensor index (index C line 126) and then sends a microcontroller index signal, index A line 128 to circuit 42 and on index B line 130 to circuit 46 after a predetermined period. Thus, each succeeding track is slightly skewed from the preceding track.

After a certain number of tracks have been written, microcontroller 50 automatically resets the track, i.e. sends the signal on index A and index B lines with no delay from the time the signal on the index C line is received. The predetermined time period of delay is such that after the disk is written the sensor index signal on the index C line never falls within a sector address field. This is necessary because when a disk is put in a prior art drive, the disk will not be read if the physical index falls within a sector address field.

The present invention is able to write a disk track much faster than the prior art systems. For a 5¼ inch low density disk, the prior art systems average forty seconds to write the entire disk. The present invention will write the same disk in 9 seconds or less.

FIG. 7 is a schematic of a disk pattern of the present invention and is designated by the general reference number 900. A plurality of tracks 902-908 are shown. Tracks 902 and 908 are comprised of a plurality of pad buffers 910, a plurality of address fields 912, a plurality of data fields 914 and a plurality of speed buffers 916.

The sensor index signal from sensor 32 is always triggered at the same radial line of disk 12. A line 920 represents the position where the sensor index signal is always triggered. In the case of system 10, this sensor index signal is the signal on the index C line.

Upon writing the first track 902, microcontroller circuit 50 receives the index C signal and because it is the first track, it immediately sends the index A and index B signals to circuits 42 and 46, respectively. This initiates the write operation and track 902 is written beginning at line 920. After verifying track 902, the heads 20 and 22 are stepped to track 904. Microcontroller circuit 50 now receives the index C signal at line 920, but delays a period of time before sending the index A and index B signals. These signals are sent when the heads 20 and 22 reach a position 922. Track 904 is written beginning at line 922. Note that track 904 is skewed from track 902.

Heads 20 and 22 finish writing and then verifying track 904 at line 922 after two complete revolutions. The heads 20 and 22 are than immediately stepped to track 906. Now microcontroller circuit 50 incrementally increases the delayed time between the index C and index A and B signals such that the writing now begins for track 906 at a line 924. After a certain number of tracks have been written in this skewed manner, the microcontroller circuit 50 automatically resets itself so that the next track, in this case, track 908, is written beginning at line 920 once again. Then the skew pattern is continued.

The amount of delay depends upon the type of disk to be written upon. The time delay must be of sufficient length to let the heads stabilize on the the new track after stepping to that track. The delay must also be such that an address field is never written over the sensor index line 920.

In the preferred embodiment of the present invention, the microcontroller circuit 50 is programmed to work with five different disk types: 5¼ inch high density, 5¼ inch low density, 3½ inch high density, 3½ inch low density and Macintosh. The type of disk can be selected using the traces 102-108. For a 5¼ inch high density disk, the disk has fifteen sectors, the delay is twenty-one milliseconds and the skew pattern is reset every eight tracks. For a 5¼ inch low density disk, the disk has nine sectors, the delay is twenty-one milliseconds and the skew pattern is reset every five tracks. For 3½ inch high density disk, the disk has eighteen sectors, the delay is twenty-three milliseconds and the skew pattern is reset every nine tracks. For a 3½ inch low density disk, the disk has nine sectors, the delay is twenty-one milliseconds and the skew pattern is reset every five tracks.

Another feature of the present invention is that a track may be reset to the original index position when necessary. Some tracks may absolutely have to be written beginning at the sensor index. In such a case, computer 52 sends the reset A signal to microcontroller circuit 50. Microcontroller circuit 50 will begin writing the next track at the sensor index. After writing that track, the microcontroller 50 will automatically return to its original skew pattern as though the reset had not occurred. It will write the next track as if the preceding track was written in the original skew pattern.

The present invention provides a disk drive which greatly speeds up the writing process. The skew pattern of the present invention may be read by standard prior art drives. The disk drive of the present invention can be installed in a PC type computer as well as industrial duplicators. The present invention is capable of adjusting to a variety of disk types.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method for writing a disk comprising the steps of:
    writing a first track with a head located at a first radial position on a disk for one full revolution, starting at a designated radial line on said disk;
    detecting said radial line after writing said first track and stepping said head to a second radial position on said disk responsive thereto; and
    waiting a predetermined time after detecting said radial line and then writing a second track on said disk, said predetermined time being a time period less than the time required for the disk to complete one revolution.

2. The method of claim 1 wherein,
    said predetermined period of time is at least as long as that necessary for said head to physically settle at substantially said second radial position.

3. A method for writing on a disk comprising the steps of:
    positioning a first and second recording heads proximate a first and a second side of a disk, respectively;
    writing a first and a second track with said first and said second heads, respectively, said first and second tracks being written simultaneously starting at a designated radial line of said disk;
    detecting said radial line after one revolution of said disk and responsive thereto stopping writing and beginning verifying said first and second tracks simultaneously; and
    detecting said radial line and stopping said verifying.

4. The method of claim 3 further including the steps of,
    after detecting said radial line and stopping said verifying, moving said first and second heads to a second position; and
    waiting a predetermined period of time after detecting said radial line and then writing a third and fourth track with said first and said second heads, respectively, said predetermined time being a time period less than the time period required to complete one revolution.

5. A disk drive system comprising:
    a data recording disk;
    rotation means connected to said disk for rotating said disk;
    at least one recording head;

head movement means connected to said head(s) for radially moving said head(s) relative to and proximate to said disk;

index means in communication with said disk for detecting when said disk is in a particular angular position relative to said head(s) and generating a sensor index signal responsive thereto;

writing means connected to said head(s) for generating recording signals on receipt of a secondary index signal; and signal delay means for generating said secondary index signal a predetermined time relative to said sensor index signal.

6. The system of claim 5 further including, selection means for adjusting said predetermined time according to the characteristic type of said data recording disk.

7. The system of claim 5 further including, track monitoring means for determining a track position of said head(s) relative to said data recording disk; and means for adjusting said predetermined time according to the track position determined by the track monitoring means.

8. A disk drive system comprising:

a magnetic media disk having first and second sides for recording data signals;

rotation means for turning said magnetic media disk;

first and second transducer heads respectively proximate to said first and second sides of said magnetic media disk;

head movement means connected to said transducer heads for moving said transducer heads radially over the surfaces of said first and second sides of said magnetic media disk;

first conversion means for converting first side digital data signals to a first side analog data signals and for optimizing said analog signals to avoid interference with a second side analog data signals; and second conversion means connected to said second transducer head for converting second side digital data signals to a second side analog data signal and for optimizing said analog signal to avoid interference with said first side analog data signals.

9. A magnetic media comprising:

a disk with magnetic media surfaces, the disk able to rotate with at least one transducer head in communication with at least one of said magnetic media surfaces; and a plurality of data tracks concentrically written on said magnetic media surfaces of the disk, each data track having a starting point that is skewed a predetermined angular distance from adjacent data tracks, said predetermined angular distance being the minimum distance along said data track that must pass under said transducer head during rotation of said disk in order for said transducer head to settle after being moved from one data track to another.

10. The media of claim 9 wherein, said disk has an index mark;

each of said data tracks comprises an address field; and each data track is positioned on its respective magnetic media surface such that no address field will coincide with said index mark.

11. A method for recording data on a rotating disk media, the disk media having a plurality of data tracks defined to exist on at least one surface of the disk media, the method comprising the steps of:

defining an index mark to exist on said disk media such that the angular position of the disk media can be determined at least once each rotation; and writing said data tracks concentrically on said disk media, each data track starting at a successively later position from said index mark such that adjacent data tracks are skewed, each data track having an address field, each data track positioned such that no address field coincides with said index mark.

12. The method of claim 11 wherein:

the writing of said data tracks is such that a first of said data tracks starts at said index mark; and after writing a plurality of consecutive data tracks, at least one subsequent data track is written such that it also starts at said index mark.

13. A disk drive system comprising:

a magnetic media disk having an index hole and a plurality of positions on at least one surface of the disk to record data tracks;

a spindle motor attached to said disk for rotating said disk;

a transducer head located proximate said disk;

a transducer head motor attached to said head for moving said head radially across rotating surfaces of said disk from one data track position to another;

an index sensor in communication with said disk index hole for determining an angular position of said disk;

a track sensor in communication with said disk for determining a position of said head relative to a radial on a surface of said disk;

conversion means connected to said head for converting digital data signals into analog data signals such that data may be communicated to and from at least one of the surfaces of said disk by the transducer head;

controller means for simultaneously controlling the flow of said data and said spindle motor and said head motor; and means to initiate data recording connected to said index sensor, the track sensor, and the controller means for monitoring the head position relative to said disk and for sending a start signal to the controller means a predetermined time after the head is moved to a new track location, said predetermined time being at least enough for said transducer head to settle after being moved from one data track to another.

14. A data recording system, comprising:

means for simultaneously writing a pair of tracks, one track on each side of a disk, the means having separate digital and analog circuits for each of a pair of heads in communication with respective sides of said disk, the means also having means for preventing interference between said heads;

means for simultaneously verifying said pair of tracks previously written;

means for stepping said heads from one radial position to another radial position relative to said disk such that another pair of tracks may be accessed by the writing means and verifying means; and means for delaying less than one disk revolution time after stepping to another pair of tracks, the delaying means able to determine when the writing means can begin to write said tracks, the delay such that adjacent tracks, once written, are skewed from one another.

15. The system of claim 14, wherein:

the delay means comprises means to read a physical index mark from said disk and means to prevent the writing means from writing a sector address field that would be coincident with said index mark.

16. A method of data recording, comprising the steps of:

simultaneously writing a pair of tracks, one track on each side of a disk, with means having separate digital and analog circuits for each of a pair of heads in communication with respective sides of said disk, the means able to prevent interference between said heads;

simultaneously verifying said pair of tracks previously written;

stepping said heads from one radial position to another radial position relative to said disk such that another pair of tracks may be accessed for writing and verifying; and delaying less than one disk revolution time after stepping to another pair of tracks and then repeating the above steps.

17. The method of claim 16, wherein:

the delaying prevents the writing step from recording a sector address field that is coincident with a physical index mark from said disk.

* * * * *